Fig 1

ARTHUR R. KANTROWITZ
FREDERICK R. RIDDELL
RALPH W. DETRA
PETER H. ROSE
INVENTORS

Jan. 21, 1964   A. R. KANTROWITZ ETAL   3,118,636
SPACE VEHICLE
Filed Jan. 8, 1959   6 Sheets-Sheet 2

ARTHUR R. KANTROWITZ
FREDERICK R. RIDDELL
RALPH W. DETRA
PETER H. ROSE
   INVENTORS

BY *Alden D. Redfield*
   *Warren Kunz*
   ATTORNEYS

Jan. 21, 1964 A. R. KANTROWITZ ETAL 3,118,636
SPACE VEHICLE
Filed Jan. 8, 1959 6 Sheets-Sheet 3

ARTHUR R. KANTROWITZ
FREDERICK R. RIDDELL
RALPH W. DETRA
PETER H. ROSE
  INVENTORS

BY
  ATTORNEYS

ARTHUR R. KANTROWITZ
FREDERICK R. RIDDELL
RALPH W. DETRA
PETER H. ROSE
           *INVENTORS*

Jan. 21, 1964   A. R. KANTROWITZ ETAL   3,118,636
SPACE VEHICLE
Filed Jan. 8, 1959   6 Sheets-Sheet 5

ARTHUR R. KANTROWITZ
FREDERICK R. RIDDELL
RALPH W. DETRA
PETER H. ROSE
        INVENTORS

BY
        ATTORNEYS

Fig 11

United States Patent Office 3,118,636
Patented Jan. 21, 1964

3,118,636
SPACE VEHICLE
Arthur R. Kantrowitz, Arlington, Frederick R. Riddell and Ralph W. Detra, Melrose, and Peter H. Rose, Lexington, Mass., assignors to Avco Manufacturing Corporation, Cincinnati, Ohio, a corporation of Delaware
Filed Jan. 8, 1959, Ser. No. 785,650
11 Claims. (Cl. 244—1)

The invention described herein may be manufactured and used by or for the United States Government for governmental purposes without payment of any royalty thereon.

The present invention relates to a space vehicle and more particularly to a novel drag brake for use with such a vehicle.

With the recent advances in missile technology, manned space flight and scientific exploration of the upper atmosphere have become of vital importance. A pressing need exists for a vehicle of sufficient functional flexibility to carry out the requisite investigations. Not only must it be capable of manned flights, but it must also be adaptable for reconnaissance purposes, bio-scientific research and study of propulsion systems and other appurtenances for space vehicles.

The present invention has been devised to meet such needs.

Since a manned vehicle presents some of the most severe operational limitations that are encountered in the field, the present invention will be described with particular reference to such an application. It should be clearly understood, however, that the invention is not limited to such use but may be readily adapted for many other purposes.

Basic requirements for a manned space vehicle include provision of (1) environment conducive to the health and safety of the occupant (2) re-entry into denser regions of the earth's atmosphere and landing under temperature and deceleration conditions within human tolerance, and (3) landing with a sufficiently high degree of accuracy to permit prompt and safe recovery of the vehicle. The present invention admirably meets all such requirements and represents a marked advance in space technology.

Briefly described, the invention comprises a capsule for carrying a man, or instruments and equipment as may be desired, into space. Associated with the capsule is an adjustable drag brake that may be opened and closed as necessary to regulate the flight path, orientation, deceleration, and landing of the vehicle. In the preferred embodiment, the drag brake comprises a plurality of ribs that are pivotally secured to the capsule for movement towards and away from it by an associated linkage. Spanning the ribs is a web of heat resistant material that is not only flexible to permit adjustment of the drag brake but is also sufficiently impervious to the passage of air to establish aerodynamic drag for decelerating the vehicle, even within the outer reaches of the atmosphere.

A particularly novel feature of the invention is the relation of the drag brake to the capsule and the disposition of its center of drag relative to the center of gravity of the entire vehicle. In the preferred form the drag brake defines a surface of revolution shaped like a bowl, the capsule being positioned within the concavity of the bowl. The numerous advantages inherent in the arrangement will be discussed in detail later in the specification.

In view of the foregoing it is a broad object of the invention to provide an improved space vehicle.

A more specific object of the invention is to provide an improved drag brake for use in association with a space vehicle.

A still more specific object of the invention is to provide a space vehicle that is particularly well adapted to human flight in space.

An important object of the invention is to provide a reliable space vehicle, which, although simple in design, nevertheless has sufficient strength and heat resistance to endure the severe environmental conditions encountered during re-entry into the denser regions of the earth's atmosphere.

A further object is the provision of a space vehicle which may be oriented within its orbit either automatically or by control of the occupant.

It is also an object of the invention to provide a space vehicle having a drag brake for retarding the rate of descent of the vehicle during landing.

Another object of the invention is to provide a space vehicle which may be landed at a preselected target with a high degree of accuracy.

Still another object of the invention is to provide a space vehicle which is designed to dissipate heat generated by molecular friction during re-entry.

It is also within the purview of the invention to provide means for collecting and focusing solar energy for energizing equipment associated with the vehicle.

An important object of the invention is the provision of means for making safe emergency escape landings during launching.

Other objects of the invention are as follows:
(a) Provision of an adjustable drag brake for regulating the rate of deceleration of a space vehicle.
(b) Provision of a drag brake the shape of which may be varied to control deceleration forces applied to a space vehicle.
(c) Provision of a drag brake having a plurality of pivoted ribs which can be actuated in concert to open or close the drag brake.
(d) Provision of a novel fabric which is satisfactory for use in an adjustable drag brake.

The novel features that we consider characteristic of our invention are set forth in the appended claims; the invention itself, however, both as to its organization and method of operation, together with additional objects and advantages thereof, will best be understood from the following description of a specific embodiment when read in conjunction with the accompanying drawings, in which:

General Description

The present availability of devices capable of launching intercontinental ballistic missiles now makes space flight an attainable goal. Emphasis has now shifted from launching devices to the evolution of space vehicles for exploiting the advantages of space flight and research. Under intense investigation are satellite vehicles capable, not only of sustained flight for the study of physical data, but also of manned flight. From an intimate knowledge of human reactions to space flight in an orbital satellite, there will be a natural transition to exploration outside of the earth's atmosphere.

Although for the current state of the art sustained flight of an instrumentated vehicle is in itself a noteworthy accomplishment, the development of a successful manned vehicle presents even more exacting problems. Throughout its flight, temperature of the vehicle must be maintained low enough to preserve the physical integrity of the structure. In addition, the temperature within the vehicle to which the pilot or occupant is exposed must be commensurate with human safety and endurance. Not only do temperature levels present a primary problem, but also the accelerations to which the pilot is exposed. Both the maximum acceleration and its time duration must be below the level where physiological damage is done to the pilot.

In addition to considerations of temperature and acceleration, due provision must be made for emergency escape of the vehicle from its launching means at any time during the launching sequence. With human life at stake, it is imperative that the recovery of the space vehicle and its occupant be possible regardless of the type of emergency that may arise.

Assuming that a successful launch to orbit has been made, orientation of the satellite vehicle may be necessary. In particular, attitude control means must be provided to damp spurious rotations that may be imparted to the vehicle during the launching sequence. In this way, unfavorable centrifugal effects can be eliminated.

Also of major importance is the recovery of the vehicle. Successful recovery not only implies a safe return to the earth but also a safe return to a preselected area with great accuracy.

The present invention is capable of meeting all of the foregoing requirements within severe weight limitations. The invention is characterized by safety, simplicity and reliability—all features of cardinal importance where human life and safety are involved.

A particular advantage of the invention is its adaptability for many uses, not only for unmanned flights, as has been mentioned, but also for different types of flight programs. Thus, the invention may be used for orbital flight at a relatively fixed altitude above the earth, or for flight in eccentric and elliptical orbits, the apogee of which may be quite remote from the earth.

Figure 1:
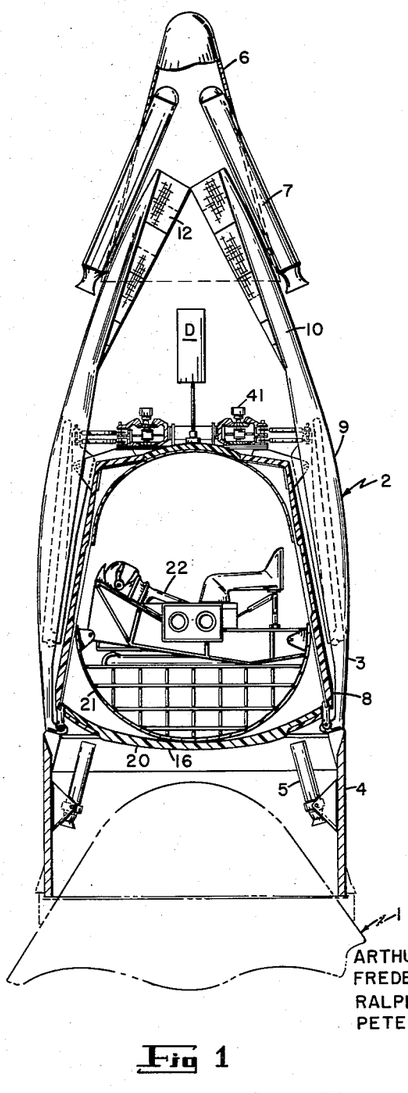
FIGURE 1 shows a cross sectional view of a manned launch assembly.
Figure 2:
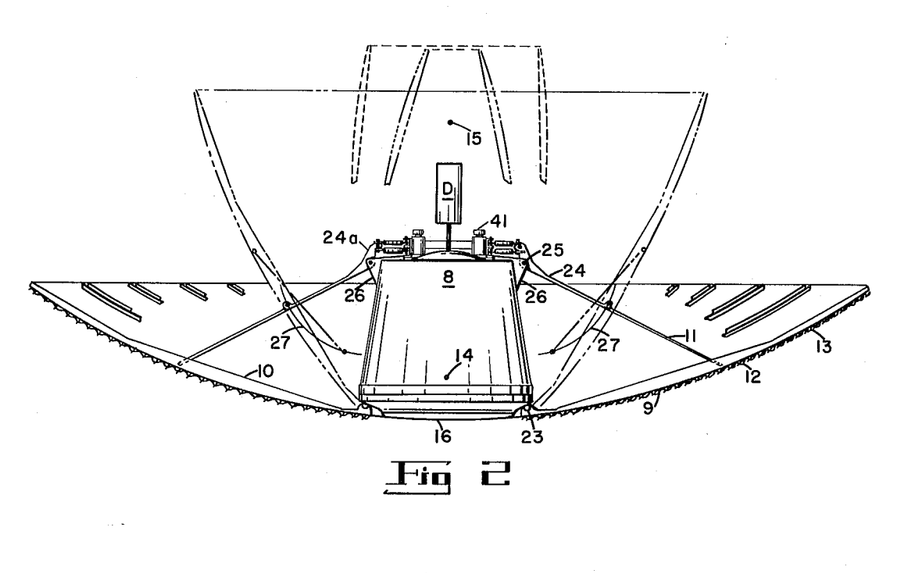
FIGURE 2 is a schematic representation of the vehicle with its drag brake in various positions.

A general understanding of the invention can be had from a study of FIGURES 1 and 2. Referring first to FIGURE 1, there is shown in phantom lines the leading end 1 of a launching device, such as a vehicle for launching intercontinental missiles. Removably attached to the launching vehicle is a launch assembly, generally designated 2, which comprises the space vehicle 3 and its escape accessories. These include a transition section 4, carrying adjustable vernier rockets 5, and a removable nose come 6 to which are secured assist-rockets 7. As will be described more fully later in this application, the vehicle 3 is separated from the nose cone and transition sections at various points during the launching sequence so that the vehicle itself, absent the nose cone and transition section, executes the programmed orbital flight.

The arrangement of the vehicle can be understood from a study of FIGURE 2 which shows a capsule 8 with which is associated an adjustable drag brake 9. In the preferred embodiment that is illustrated, the drag brake comprises a plurality of radially extending ribs 10 which can be adjusted between the full, phantom and dash line positions by means of associated struts 11 and actuating mechanism to be described.

Figure 3:
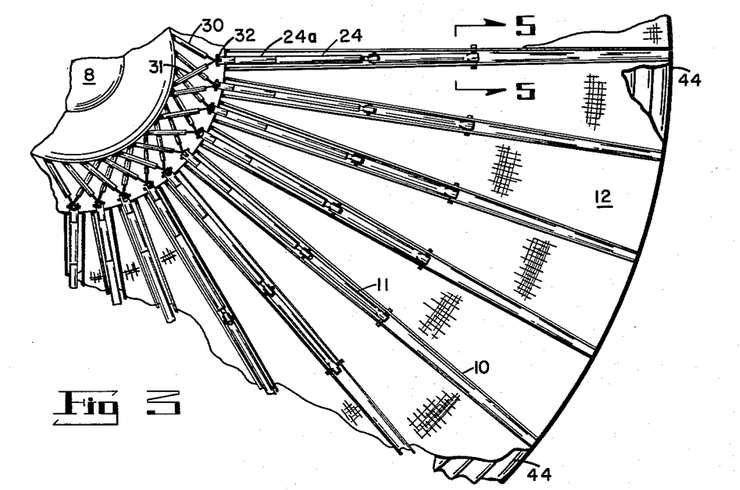
FIGURE 3 is a fragmentary plan view of the capsule and a portion of the associated drag brake.

As shown in FIGURE 3, the ribs are covered by a reticulated fabric 12. The fabric, stretched over the ribs when extended, surrounds the capsule on all sides and defines a bowl-shaped drag surface 13. The shape of the surface is a function of rib position as indicated by FIGURE 2. In the interest of simplicity, only those ribs below the plane of the paper have been shown. It will be understood, however, that the drag surface is a surface of revolution described about the longitudinal axis of the capsule.

Attention is particularly invited to the position of the capsule relative to the drag surface. As illustrated in FIGURE 2, the center of gravity 14 is in advance of the center of drag, indicated at 15 for the fully deployed position of the drag brake. The position of the center of drag varies with drag brake position but is always behind the center of gravity. During flight in the earth's atmosphere, the drag of the air moving over the drag surface orients face 16 of the capsule in the direction of forward movement with the drag surface extending rearwardly therefrom. It should be emphasized that the capsule is not suspended from a canopy as in a conventional parachute. Instead, when required, the capsule is decelerated by the drag surface which radiates out from its leading surface.

Returning to a consideration of FIGURE 1, it will be noted that the ribs 10 are shown in a fully retracted position with the distal ends of the ribs housed within the removable nose cone 6. During ascent to flight altitudes, the ribs remain folded and present a smooth outer contour to the high velocity air stream encountered during launching.

If, prior to take-off of the launching vehicle, an emergency arises necessitating ejection of the space vehicle, it can be separated from the launching vehicle and elevated to a safe altitude for descent by energizing rockets 7. Vernier rockets 5 may be controlled gyroscopically to steer the vehicle during such escape. To illustrate, the assist-rockets 7 have sufficient power to carry the space vehicle to an altitude of about 6000 feet where the drag surface may be fully extended to permit descent of the vehicle back to earth at safe velocities. After attaining altitude, the nose cone and transition sections are jettisoned from the vehicle.

Figure 6:
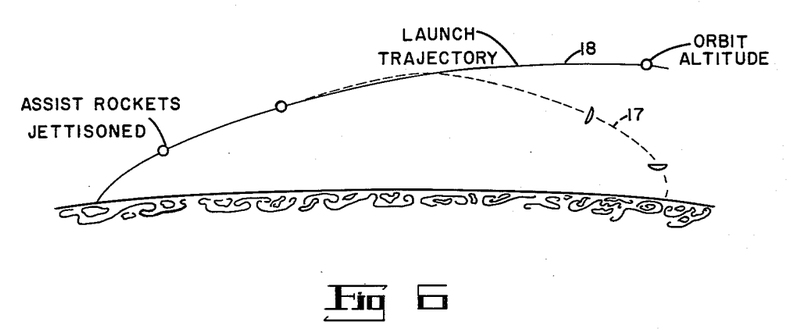
FIGURE 6 is a pictorial representation of the launching sequence of the satellite showing an escape trajectory after launching.

All possible escape conditions have been considered in the design of the vehicle. Should escape be necessary after take-off, rockets 7 have sufficient power to push the vehicle assembly away from the onrushing launching vehicle. After staging of the launching vehicle, i.e., jettison of booster rockets, the nose cone assembly may be jettisoned since the vernier rockets have sufficient power to produce the necessary separation of the space and launch vehicles under such operational conditions. Attention is directed to FIGURE 6 showing in dash lines a typical escape trajectory 17 described by the space vehicle after staging. Since the space vehicle is already at altitude, it is merely necessary to use the vernier rockets for separation and guidance. After separation from the launching vehicle, the drag surface is extended to bring the vehicle safely to earth.

FIGURE 6 illustrates by the full line curve 18, successful launching of the space vehicle to a satellite orbit which, for convenience, may be assumed to be at an altitude of approximately 100 nautical miles. It will be understood by those skilled in the art, however, that the orbital altitude may be chosen at will commensurate with launch capabilities of the launching vehicle and the weight of the launch assembly.

Because of the adjustability of the drag surface, flight programming is very flexible. This has already been illustrated in the discussion of escape techniques. It may also be relied upon in terminating orbital flight at will and for landing the vehicle on a pinpoint target regardless of prevailing atmospheric conditions. This will be described at greater length later in the specification.

*Structural Details*

The construction of the capsule can best be understood from FIGURE 1 which shows an insulated metal clad wall 20 housing a metal container 21 surrounding the pilot 22. The pilot is supported in a recumbent position, as illustrated, for maximum safety in sustaining the accelerations and decelerations of ascent and descent. Thus, in FIGURE 1, the launching thrust is directed against the back of the pilot as are the decelerating forces during descent.

Since they do not concern the present invention, the interior appointments of the capsule will not be discussed in detail. It will be sufficient to mention that provision must be made for the physiological needs of the pilot and such instrumentation and telemetry equipment as is necessary for collecting and transmitting data during flight.

Attention may now be directed to the mechanism for opening and closing the drag brake. As illustrated in FIGURE 2, the ribs are pivotally secured at 23 to the exterior of the capsule adjacent surface 16. When fully extended, the ribs and associated fabric form a smooth contour with the capsule wall.

To each rib is pivotally secured a strut 11, each strut being pivotally secured in turn to an associated actuating lever 24. These levers are pivoted, as at 25, to brackets 26 which are secured to the end of the capsule remote from surface 16. As indicated by the arcs 27, levers 24 may be swung toward and away from the capsule, moving the articulated struts 11 to retract or extend the ribs. In the fully extended position shown in full lines in FIGURE 2, the levers and their associated struts are aligned to form compression members for transfering the resultant drag forces to the structure of the capsule.

Figure 5:
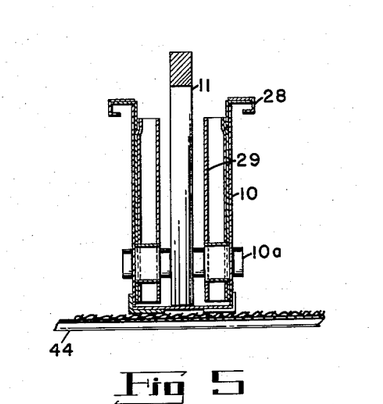
FIGURE 5 is a cross sectional view taken on plane 5—5 of FIGURE 3 showing the construction of one of the ribs of the drag brake.

Since significant bending moments may be imposed on the rigs, they preferably have a channel cross section as shown in FIGURE 5 and may include reinforcing channels 28 as well as reinforcing side plates 29 adjacent the pivot pin 10a which secures the strut to the rib.

Figure 4:
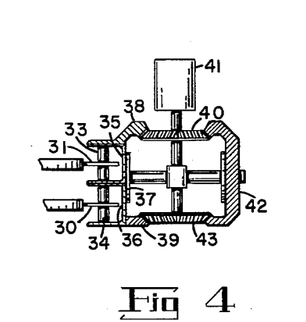
FIGURE 4 is an enlarged fragmentary view of a portion of the linkage and associated mechanism for actuating the drag brake.

Each lever is actuated by a pair of links. Since the links are identical for any individual lever, it will suffice to explain one set. Thus in FIGURE 3, links 30 and 31 are pivotally secured at 32 to the upper end 24a of the lever. As shown in FIGURE 4, the ends of the links remote from the lever are pivotally secured by pins 33 and 34 to separate rotatable rings 35 and 36. These are guided for rotation about the upper end of the capsule as by a stationary back-up ring 37. A circular bevel gear 38 is attached to ring 35. Another circular bevel gear 39 is secured for conjoint rotation to ring 36. Gear 38 is directly driven by bevel pinion 40 which is directly connected to a drive motor 41. Also engaged with the bevel pinion 40 is an idler gear 42 which transfers the driving action to a lower separately rotatable driving pinion 43 engaged with gear 39. When it is desirable to open or close the drag brake, motor 41 is energized to impart opposite rotation to the gears 38 and 39. In this way, the rings 35 and 36 are rotated by similar amounts in opposite directions, either drawing the links 30 and 31 towards the capsule for moving the associated rib towards the closed position, or extending the links for moving the rib towards the open position.

It will be understood that, as illustrated in FIGURE 1, more than one driving motor may be used.

Not only is the operating structure simple and reliable, but it makes possible accurate adjustment of the drag surface to any position necessary for a particular rate of deceleration of the vehicle.

The exterior walls of the capsule may be made from stainless steel or nickel alloy sheets which are not only corrosion resistant but have high strength at elevated temperatures and readily radiate heat generated by re-entering the denser regions of the earth's atmosphere. The fabric 12 defining the drag surface may be woven from one mil stainless steel wire. The fabric may be 400-mesh or greater and, to render the fabric more impervious to passage of air, it may be clad with ½ mil thick ribbon foil 44 (see FIGURE 3). The foil may be ultrasonically welded to the ribs and overlapped, shingle fashion, to resist penetration of the air. Naturally, the direction of overlap of the foil is chosen to prevent the air stream from getting between the ribbon covering and the fabric 12. Although when the drag brake is partially closed the ribbon does not conform closely to the surface of the fabric, the wind resistance is so slight that damage to the foil does not occur.

*Orbital Flight and Landing*

Figure 8:
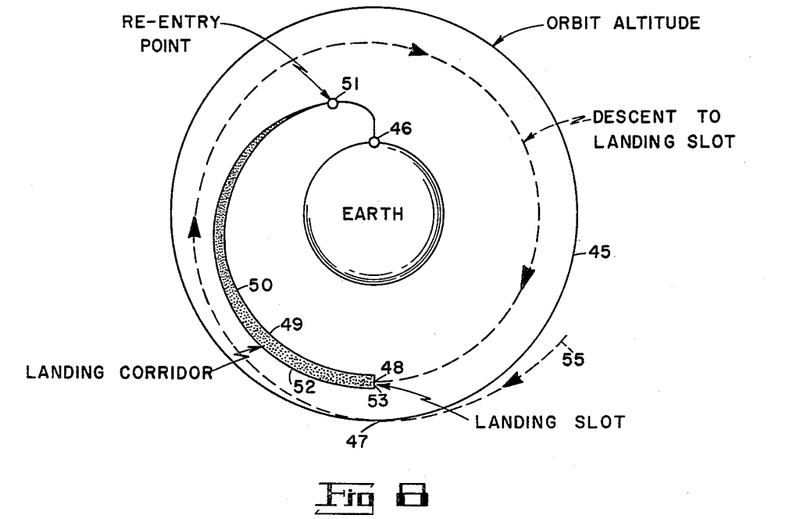
FIGURE 8 is a diagram of the flight path of the vehicle in approaching the earth for landing.

For simplicity in describing the operation of the drag brake in landing the space vehicle, it will be assumed that the vehicle has been launched into a circular orbit 45 at 100 nautical miles altitude, as shown in FIGURE 8. Under typical flight conditions, the vehicle would circle the earth once in approximately 88 minutes, travelling at a velocity of approximately 18,000 miles per hour. Assuming a drag brake having 1000 square feet of frontal area, landing at a pinpoint target 46 can readily be effected in one and a half trips about the earth. To illustrate, it will be assumed that the landing decision has been made at point 47 on orbit 45. As such time, the drag brake would be extended to its full open position and, in the ensuing revolution, the vehicle would spiral to approximately the altitude indicated at 48. This is the ideal point of entry into a landing corridor 49 defined by a lower limit 50 in which landing can be successfully effected with the drag brake closed at all times during descent to the re-entry point 51. The upper limit 52 of the landing corridor is defined by the flight path along which landing can be successfully effected with the drag brake fully open at all times until landing. So long as the vehicle trajectory lies within the landing corridor, the re-entry point 51 can be successfully attained. At such point, the drag brake is fully opened and final descent to landing at 46 is effected. The re-entry point is desirably chosen where the deceleration attains a value of .05 g.

Ideally, the landing corridor should be entered through the midpoint 48 of the landing slot 53, i.e., the entrance area of the landing corridor the width of which is a function of desired landing accuracy. In such idealized position, the drag brake should be half open, and under ideal conditions it is possible to arrive at the re-entry point without further adjustment of the drag brake. Under actual flight conditions, however, entry at any point in the landing slot is satisfactory, and it is merely necessary to open or close the drag brake sufficiently to remain within the landing corridor for making a successful landing. In other words, if the vehicle enters the corridor near its high altitude limit, the drag brake is opened more than halfway to provide sufficient drag to confine the vehicle to the corridor. Conversely, if the vehicle enters near the lower altitude limit, the drag brake is closed until the drag is reduced sufficiently to assure that the vehicle stays within the corridor.

Figure 9:
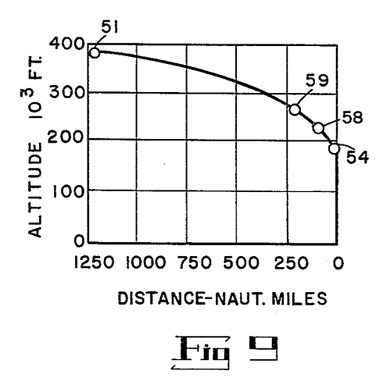
FIGURE 9 is a graph of altitude vs. distance travelled by the vehicle immediately prior to landing.

Attention is now directed to FIGURE 9 showing a graph of altitude vs. distance travelled by the vehicle after passing the re-entry point 51. With the drag brake fully opened, the vehicle is gradually decelerated until it reaches terminal velocity at 54. The vehicle then slowly descends to earth, eventually landing at a speed of about 50 feet per second.

From the foregoing description of a typical circular orbit-to-landing sequence, it is apparent that very little manipulation of the drag brake is necessary. Under average conditions, landing can be effected within ±150 miles of a preselected target. The exact size of the area depends upon wind drift and uncertainties in estimating atmospheric conditions.

By controlled adjustment of the drag brake throughout its entire flight, including the re-entry portion, particularly with knowledge of prevailing wind and atmospheric conditions, exact landing control can be attained with an error of only a few miles.

Not only is the drag brake effective in landing the vehicle from its flight orbit, but it is also of value in orienting the vehicle during flight. It will be recognized, however, that while in orbital flight, the drag brake will be fully closed and the drag available for righting purposes will be relatively small. For quick orientation, use of an attitude control system such as disclosed and claimed in pending application Serial No. 688,801, filed September 27, 1957, by A. R. Kantrowitz, M. B. T. George, and Herman Halpern, on "Means For and Method of Controlling Attitude of Re-Entry Vehicle" is advisable.

For simplicity, descent of the vehicle from a circular orbit has been described. It should be understood, however, that the invention is equally useful in controlling the descent of a vehicle from an elliptical or an eccentric orbit, as indicated at 55 in FIGURE 8. Under such flight conditions, the drag brake is opened while passing through perigee. This causes the vehicle to execute a more nearly circular flight path about the earth. During ensuing trips the drag brake is opened and closed until the orbit is rendered substantially circular. Controlled descent with the drag brake wide open is then effected to the landing corridor in the manner described earlier with reference to FIGURE 8.

Figure 7:
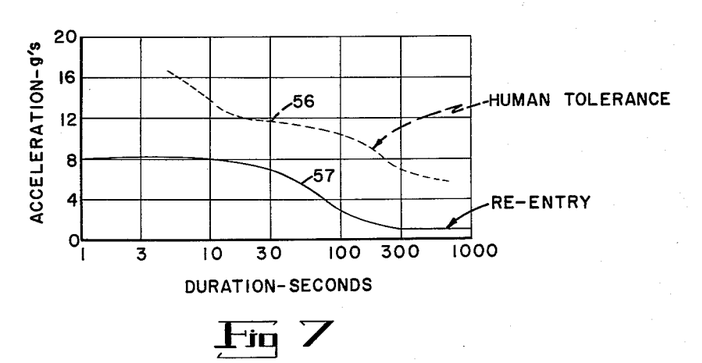
FIGURE 7 is a graph showing accelerations to which a human being is subjected during re-entry compared to the limits of human tolerance.

One prime consideration during the landing of the vehicle is the deceleration to which the pilot is subjected. Curve 56 of FIGURE 7 shows the estimated upper limit of human endurance to acceleration for different time periods. Also plotted on the graph is curve 57 showing the deceleration of the vehicle during re-entry into the earth's atmosphere. It will be noted that a maximum deceleration of 8.2 g's is attained which is well below the limit of human tolerance. This maximum point is shown at 58 in FIGURE 9.

Figure 10:
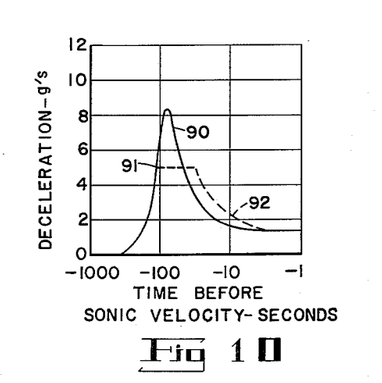
FIGURE 10 is a graph showing deceleration of the vehicle vs. time under various operating conditions.

Attention is directed to FIGURE 10 which shows the variation of deceleration with time prior to that point where the vehicle attains sonic velocity. As in the graph of FIGURE 7, the deceleration attains a maximum value of 8.2 g's. The full line curve 90 is indicative of deceleration encountered by the vehicle in travelling from the re-entry point to the ground target.

Should it be desirable to reduce the peak deceleration to which the pilot is subjected, the drag brake may be partially closed at point 91 and adjusted thereafter as required to maintain a substantially constant rate of deceleration as indicated by the dash line curve 92. Upon attaining a lower velocity at a lower altitude, the drag brake may be fully opened again to make the final descent to ground level.

It will be recognized that the time integration of the deceleration curves must in both cases be equal since the deceleration is equal to $$\frac{dv}{dt} \text{ and } \int \frac{dv}{dt} \cdot dt = v$$

The velocity $v$ is assumed to be the same at the re-entry point for the two curves shown in FIGURE 10.

The highest temperature attained by the vehicle occurs at the center of the leading face 16 of the capsule during the re-entry phase. It is estimated that the maximum temperature attained will be well under 1500° and that it will occur at point 59 as shown on the altitude-distance graph of FIGURE 9. Interior capsule temperatures will not exceed 130° F. With the aid of refrigeration lower temperatures can be maintained.

An important characteristic of the present invention is the ability of the drag brake to radiate heat to the atmosphere. This is obviously of importance in maintaining the structural integrity of the vehicle and makes it possible to construct the entire vehicle of readily available materials that are well within the state of the art.

Another benefit of the drag brake configuration is that it may serve as a reflector for solar energy to focus it on a radiant energy sensitive surface of an energy producing device D (see FIGURE 2) such as the boiler of a prime mover. In this way electrical energy may be generated for operating the drag brake, telemetry system, instruments or other accessories of the vehicle.

At this point it is well to emphasize that the shape of the drag surface may be chosen with respect to the particular use for which the vehicle is intended. Although a hemispherical drag surface is shown in the figures, it could be shaped like a hyperboloid or a paraboloid. Thus, for reflecting radiant energy to an energy converter, it might be desirable to use a parabolically shaped surface.

Control System

Figure 11:
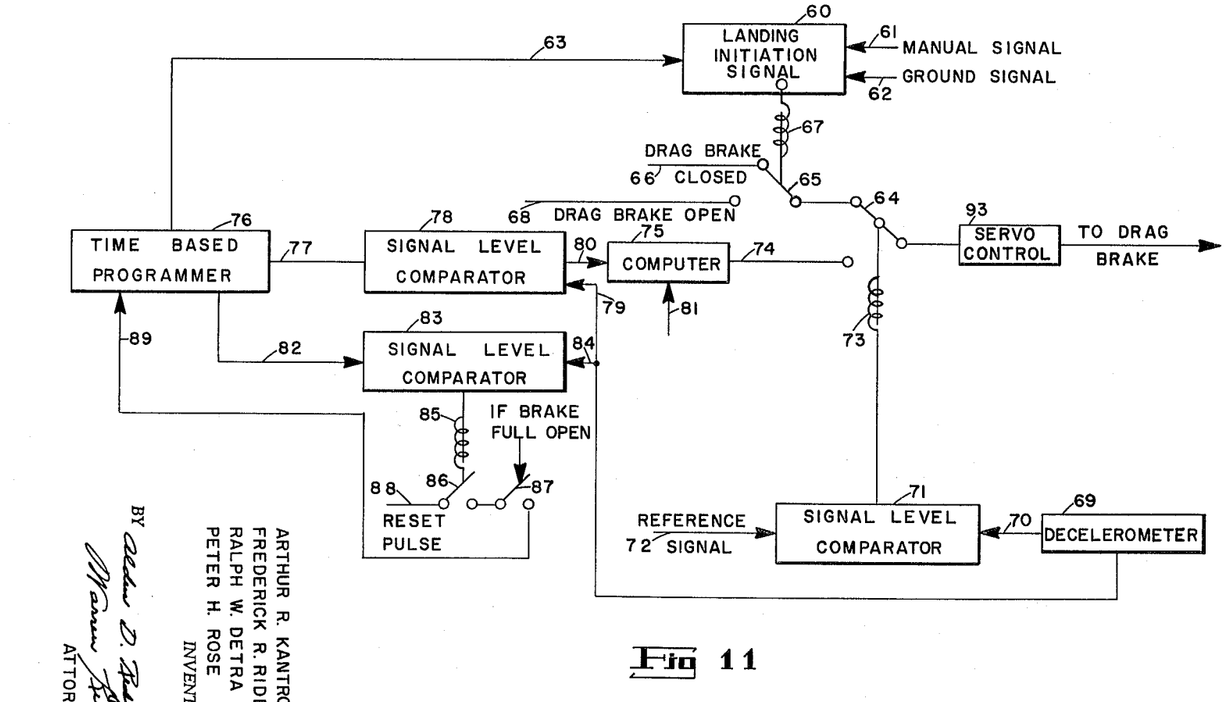
FIGURE 11 is a schematic representation of a control system for the space vehicle.

To illustrate operation of the vehicle in the manner described, there is shown in FIGURE 11 a typical control system that might be used for controlling the drag brake.

Shown at 60 is a signal source for initiating landing. Landing may be initiated by triggering the signal source either by a manual signal 61 or a ground signal 62, or a time-based signal 63. In other words, the landing sequence could be initiated by the pilot in manually feeding a landing signal to the signal source 60. The landing signal could be obtained, however, from a ground based transmitter, feeding its signal into the signal source at 62. For fully automatic control, signal 63 could be supplied by a time-based programmer 76 which uses as a reference the take-off time or the time indicated by the reception of a ground transmitted signal.

Before energization of the signal source 60, servo control 93, which physically controls the position of the drag brake, is connected electrically through switches 64 and 65 to signal 66 which directs the servo to maintain the drag brake fully closed.

Upon energization of the signal source 60, its associated relay 67 shifts switch 65 to signal source 68 which directs the servo control to open the drag brake fully. This is done, for instance, in circular orbit at point 47, FIGURE 8. This causes the vehicle to descend to the landing slot 53. Arrival of the vehicle at landing slot altitude is indicated by a preferred value of deceleration sensed by decelerometer 69, the output signal of which is supplied by conductor 70 to a signal level comparator 71. To the comparator is also supplied a reference signal 72 which is characteristic of deceleration at landing slot altitude. When the deceleration attains the level of the reference signal, the comparator energizes relay 73, shifting switch 64 to complete the circuit with conductor 74. This conductor receives control signals from a computer 75, as will be described, and directs the servo control 93 to open and close the drag brake as dictated by the deceleration program determined by the time-based programmer 76.

The time-based programmer 76 supplies a deceleration-time program through conductor 77 to a signal level comparator 78. In effect, the deceleration program dictates at any time what the preferred value of vehicle deceleration should be. The program is continuously compared to the actual deceleration supplied to comparator 78 by conductor 79. Here the two values of deceleration are compared and an error signal is supplied through conductor 80 to the computer 75. The computer receives a signal 81 indicating the actual position of the drag brake at any time and the computer automatically determines the position to which the drag brake should be adjusted in order to effect the proper deceleration program under prevailing altitude and atmospheric conditions.

If a landing signal is initiated under the control of the time-based programmer as has been described, the entire landing sequence from orbit to the ground can be programmed, either at the time of the take-off, or by telemetered information sent to the satellite during flight.

Two conditions of abnormal descent should be noted. Should the vehicle descend from orbit to landing slot altitude prior to arriving at the landing slot 53, a fact that would be detected by the time-based programmer, the programmer would supply the comparator 78 and the computer 75 with such knowledge and a signal for closing the drag brake would be supplied to conductor 74. With the drag brake closed, the vehicle would continue to orbit at landing slot altitude until the actual landing slot was entered. At such time the deceleration program of the time-based programmer would prevail and the vehicle would follow a trajectory within the landing corridor.

Should the vehicle exceed the upper limit of the landing corridor at any time during its passage from the landing slot to the re-entry point, the drag brake would be fully closed to permit an orbital flight to a subsequent point where the landing corridor could again be re-entered. To illustrate, with reference to FIGURE 11, the time-based programmer supplies a minimum permissible deceleration program at all times through conductor 82 to signal level comparator 83. A deceleration signal is also supplied to the comparator through conductor 84. Should the actual deceleration fall below the minimum permissible deceleration at any time, relay 85 is actuated to close switch 86. A second switch 87 in series with switch 86 is closed if the drag brake is fully open, permitting, in such event, a reset pulse 88 to pass through the series switches to conductor 89 for resetting the time-based programmer. The programmer thereupon restores switch 65 to pass the "drag brake closed" signal to the servo control 93 closing the drag brake and permitting the vehicle to orbit for a predetermined time period after which the vehicle can again enter the landing corridor. Depending upon the point at which the vehicle departed from the upper limit of the landing corridor, re-entry into the corridor might occur at a point more advanced along the landing corridor than the landing slot.

The foregoing description of the control system is included for illustrative purposes to demonstrate how the drag brake could conceivably be controlled to effect vehicle landing under a variety of conditions. The control system itself comprises no part of the present invention and for this reason, has only been shown diagrammatically. It is important to note, however, the flexibility of the vehicle in executing a variety of flight programs and to note that the drag brake affords a relatively simple means for accomplishing the desired programs.

*Conclusion*

From the foregoing description of the present invention it will be apparent that a space vehicle has been disclosed which is not only safe for research investigations in space, but may also be used as a safe vehicle for manned flight. Not only does the invention make possible controlled deceleration of the vehicle within the limits of human tolerance, but it also makes possible accurate recovery of the vehicle. Control of the vehicle may be effected fully automatically or may be under the control of a pilot.

Temperature limits do not exceed those commensurate with safety nor do they jeopardize the durability of the vehicle.

The various features and advantages of the design and construction disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention as defined by the following claims.

We claim:

1. A space vehicle comprising a capsule having a forward portion in advance of a rearward portion in the direction of movement during re-entry of the earth's atmosphere, an adjustable drag brake secured to the forward portion of said capsule and surrounding it to define a bowl-shaped drag surface with a portion of said capsule surface exposed at the center of the drag surface, and means for adjusting the shape of the drag surface for controlling the drag on the vehicle, the center of gravity of the vehicle being in advance of its center of drag in the direction of movement and said drag surface decreasing in diameter in the direction of movement.

2. A space vehicle for travelling in the earth's atmosphere comprising an adjustable drag brake, said drag brake being bowl-shaped, a capsule having a forward portion in advance of a rearward portion in the direction of movement disposed within the concavity of said drag brake, and adjustable means securing said drag brake to said capsule for adjusting its shape to control the deceleration of the vehicle in passing through the atmosphere, said drag brake decreasing in diameter in the direction of movement.

3. In combination, means having a forward portion in advance of a rearward portion in the direction of movement during re-entry of the earth's atmosphere for conveying a load in space, and an adjustable drag brake defining a bowl-shaped drag surface surrounding said means, said drag brake comprising a plurality of radially disposed ribs pivotally secured at their inner ends to the forward portion of said means, articulated means interconnecting said ribs and said first-named means, means for adjusting the position of said articulated means for moving said ribs towards and away from said first-named means, and a covering over said ribs for defining a drag surface, said drag surface decreasing in diameter in the direction of movement.

4. Apparatus as defined in claim 3 in which said covering comprises a reticulated mesh of heat-resistant wires secured to said ribs.

5. Apparatus as defined in claim 4 and, in addition, sheets of heat-resistant material attached in overlapping relation to the mesh of said covering for rendering it impervious to passage of gases.

6. In combination in a vehicle for travelling in a gaseous medium, load conveying means, means for utilizing solar energy secured to said load conveying means, and drag producing means secured to load conveying means and extending outwardly therefrom for retarding the vehicle and for radiating heat generated by its passage through the gaseous medium, said drag producing means being shaped to reflect solar energy and to focus such energy on said solar energy utilizing means.

7. A space vehicle comprising a capsule, an extendable bowl-shaped drag brake attached to said capsule for controlling deceleration of the vehicle in passing through a gaseous medium, said drag brake having a covering made from a mesh of heat-resistant wires, first means for actuating said drag brake, second means responsive to deviations from predetermined flight characteristics for controlling said first means during the initial approach of said vehicle to the earth, and third means for controlling said first means during the final approach of said vehicle to earth to maintain said drag brake in its fully open position.

8. Apparatus as defined in claim 7 and, in addition, a covering of metallic foil over said mesh.

9. In a manned space satellite vehicle for making programmed flights in the earth's atmosphere terminated by a landing at a preselected target, means having a forward portion in advance of a rearward portion in the direction of movement during re-entry of the earth's atmosphere for conveying a man in space, a bowl-shaped drag surface secured to said means for controlling its rate of deceleration in the earth's atmosphere, said drag surface being variable in shape to regulate the rate of deceleration in accordance with the programmed flight, extension of said drag surface retarding descent of said first-named means to the preselected target, said drag surface being attached to said forward portion and decreasing in diameter in the direction of movement whereby the center of gravity of said means for conveying a man in space is in advance of its center of drag in the direction of movement, and compression members for extending said drag surface connected between said drag surface and said rearward portion, said compression members transferring drag forces to said rearward portion.

10. In a manned space vehicle for making programmed flights in the earth's atmosphere a sealed-heat-resistant capsule for conveying a man in space, an extensible hemispherical drag brake surrounding said capsule, said drag brake comprising a plurality of radially disposed ribs pivotally secured to said capsule for simultaneous movement towards and away therefrom, a plurality of levers pivotally secured to said capsule at points remote from the points of attachment of said ribs, a plurality of struts interconnecting said levers and said ribs, an articulated link connected to each of said levers, means for extending and retracting said links relative to said capsule whereby said levers move said ribs towards and away from said capsule, and a flexible fabric spanning said ribs, said fabric comprising a reticulated mesh of heat-resistant wires and metal sheets secured to said fabric in overlapping relationship.

11. Apparatus as defined by claim 10 and, in addition, deceleration responsive means for adjusting the position of said ribs whereby programmed deceleration of the vehicle is accomplished.

References Cited in the file of this patent

UNITED STATES PATENTS

| | | |
|---|---|---|
| 454,325 | Brandt | June 16, 1891 |
| 1,464,339 | Radon | Aug. 7, 1923 |
| 1,640,110 | Bunevac | Aug. 23, 1927 |
| 1,757,603 | Thompson | May 6, 1930 |
| 2,835,548 | Baumann | May 20, 1958 |
| 2,837,300 | Sullivan | June 3, 1958 |

FOREIGN PATENTS

| | | |
|---|---|---|
| 532,929 | Germany | Sept. 5, 1931 |
| 368,727 | Italy | Mar. 1, 1939 |

OTHER REFERENCES

Interavia, December 1957, p. 1238.

Project Satellite, by Kenneth W. Gatland, pp. 71 and 72. Printed in Great Britain at The Chapel River Press. Andover, Hants. Second Impression May 1958.

"Space Technology," pp. 49, 51 and 52, Aviation Week, July 7, 1958.